(No Model.) 2 Sheets—Sheet 1.

W. P. KOOKOGEY.
ELECTRIC BATTERY.

No. 385,760. Patented July 10, 1888.

Witnesses,
James P. DuHamel
Walter S. Dodge

Inventor:
William P. Kookogey
By his Attorneys,
Dodge Son (No Model.) 2 Sheets—Sheet 2.

W. P. KOOKOGEY.
ELECTRIC BATTERY.

No. 385,760. Patented July 10, 1888.

ON LINE x-x.

Witnesses
James F. DuHamel
Walter S. Dodge

Inventor:
William P. Kookogey,
By his Attorneys,
Dodge & Son.

UNITED STATES PATENT OFFICE.

WILLIAM P. KOOKOGEY, OF BROOKLYN, NEW YORK, ASSIGNOR TO THE KOOKOGEY ELECTRIC COMPANY.

ELECTRIC BATTERY.

SPECIFICATION forming part of Letters Patent No. 385,760, dated July 10, 1888.

Application filed June 7, 1887. Renewed June 9, 1888. Serial No. 276,570. (No model.)

*To all whom it may concern:*

Be it known that I, WILLIAM P. KOOKOGEY, of Brooklyn, in the county of Kings and State of New York, have invented certain new and useful Improvements in Batteries, of which the following is a specification.

My invention relates to electric batteries or generators, and is designed to render the same more convenient of manipulation and less liable to derangement than is the case with those now in use. With this end in view I construct the battery as illustrated in the accompanying drawings, in which—

Figure 1:
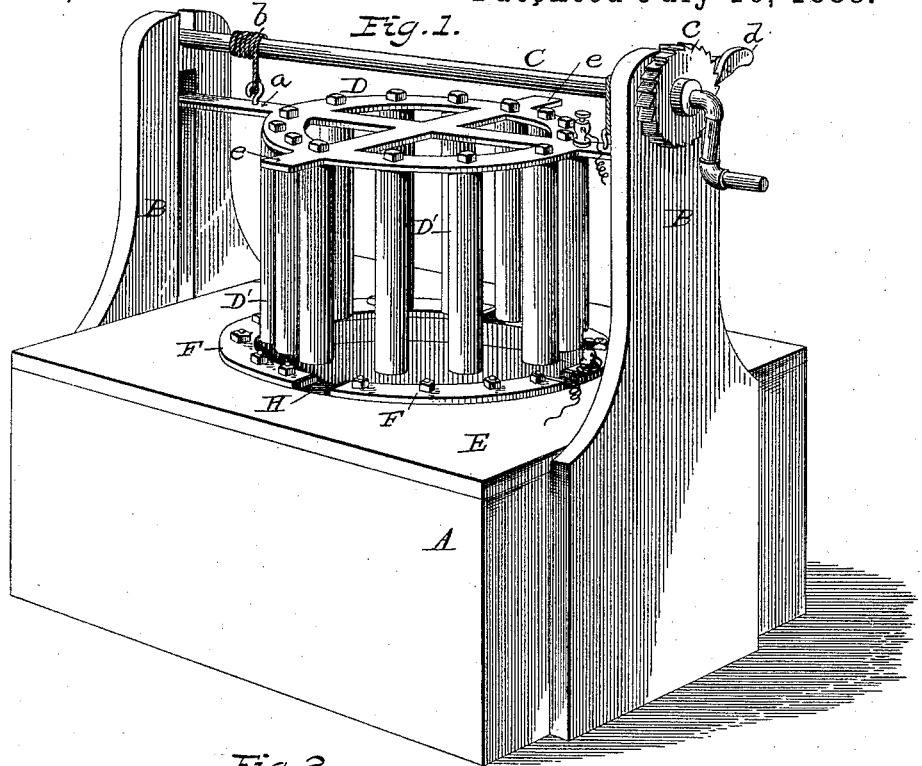
Figure 2:
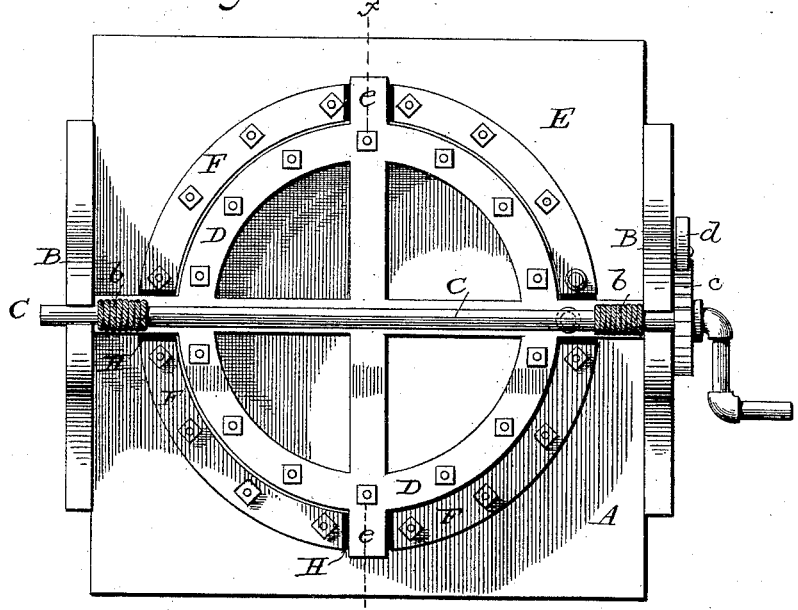
Figure 3:
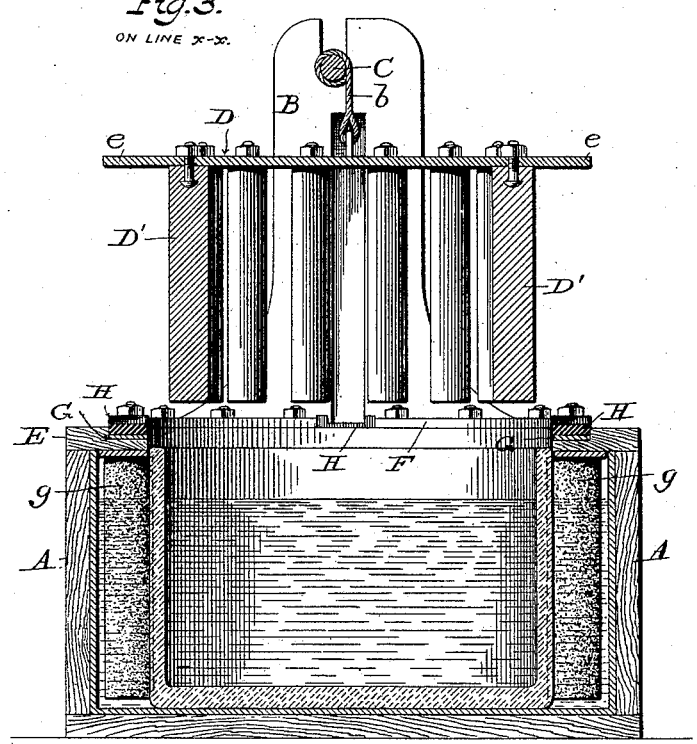
Figure 4:
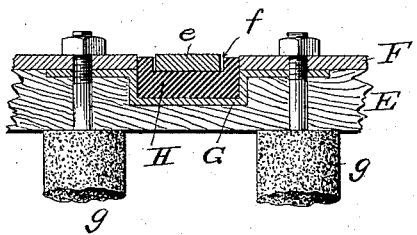

Figure 1 is a perspective view of a battery constructed in accordance with my invention and showing the zinc element raised from the bath or solution. Fig. 2 is a top plan view of the same. Fig. 3 is a transverse section on the line $x\ x$, and Fig. 4 is an enlarged section of the connection between the segments of metal which connect the pencils or rods constituting one of the battery elements.

Referring again to the drawings, A indicates a box, of wood or other suitable material, which will be lined with lead or other substance unaffected by chemicals used in the battery-solution. At each end of the box or receptacle is a standard or upright, B, notched or recessed at its top to receive a longitudinal shaft, C, which is designed to lift the zinc element and its carrying-frame D from and above the solution. The inner faces of the standards are grooved vertically to form guides for projecting arms $a$ of the frame or connecting-plate D of the zinc element, to which frame the zinc rods are attached by means of threaded stems passing upward through openings in the frame D, and either screwing into said openings or provided above the frames with nuts.

From the arms $a$ cords or bands $b$ pass upward to and about the shaft C, so that as said shaft is rotated in one or the other direction the ropes will be wound upon or paid off from said shaft, and thus caused to raise or lower the frame D and the zinc element supported and carried thereby.

The shaft C is provided with a ratchet-wheel, $c$, which is locked by a dog or pawl, $d$, to prevent the backward rotation of the shaft and the descent of the frame D, said dog or pawl being provided with a tail or extension, by which its point may be thrown out of engagement with the ratchet, when necessary, to permit the lowering of the frame. The zinc element D' enters a porous cup which is placed within the box or cell A, and the carbon element $g$ is placed outside of said cup, and may be conveniently formed of a series of carbon rods or pencils arranged in a circle concentric with the zinc element and the porous cup, though obviously the precise arrangement is not material, and this applies also to the arrangement of the rods or pencils of the zinc element, which may be arranged in any desired figure or shape.

The carbon rods or pencils are each provided with a threaded stem, which passes upward through the top or cover E of the box A and through a segment, F, of brass or other good conductor, lying upon the top of the cover E. Four of such segments are employed, preferably, although the number may be increased or diminished, and these segments are connected in the manner illustrated in Fig. 4—that is to say, a depression is formed in the top or cover E at a point between the proximate ends of each segment and the one following, in which depression is placed a band, strip, or plate, G, of brass, copper, or other good conductor, the ends of which are carried upward and lie between the upper face of the top or cover E and the under face of the segments, the two being drawn closely together by the nuts applied to bind the carbon rods or pencils and the segment F together. This connection, which is employed throughout the series of segments, makes a perfect electrical connection between the segments, and constitutes them, in effect, a continuous ring. A block, H, of rubber or other good insulating material, of the form shown in Fig. 4—that is to say, designed to fit and fill the space between the proximate ends of the segments F and above the connecting-strip G, and having a recess, $f$, in its upper face—is embedded in said space and secured therein by cement, or by its own elasticity and consequent pressure against the walls of the recess, or in any other convenient manner.

The spaces between said segments are designed to afford room for the arms $a\ a$ of the frame D and for arms $e\ e$ thereof, each projecting at right angles to the arms $a\ a$, as plainly shown in Figs. 1 and 2. These arms, entering the recesses in the upper faces of the insulating-blocks, effectually hold the arm D against movement, and consequently maintain a perfect insulation of the frame from the segments which connect the pencils or rods of the element carried thereby. This arrangement permits the batteries to be handled freely and more or less roughly without danger of shifting the frame D, and thereby producing contact with the segments F, or in any other manner short-circuiting the battery.

Having thus described my invention, what I claim is—

1. The herein-described battery, consisting of the box or receptacle A, uprights B, grooved on the inner faces, top or cover E, provided with segments F, connected one with another and carrying a carbon element, shaft C, mounted in the standards B, frame D, carrying the zinc element and provided with arms $a\ e$, and bands extending from the arms $a$ to the shaft C and passing about the same, substantially as and for the purpose set forth.

2. In combination with the box or receptacle A, the carbon element $g$, a carrying-plate, F, therefor, composed of segments separated at their ends one from the other, but electrically connected, and frame or plate D, carrying the zinc element D', provided with arms to enter the spaces between the ends of the segments of plate F, substantially as and for the purpose set forth.

3. In combination with box A, cover E, the latter provided with segments F and connecting-pieces G, insulating-blocks between the ends of the segments, a carbon element connected with segments F, frame or plate D, carrying a zinc element and provided with arms $a$ and $e$, to enter the spaces between the segments, substantially as set forth.

In witness whereof I hereunto set my hand in the presence of two witnesses.

WM. P. KOOKOGEY.

Witnesses:
WILLIAM W. DODGE,
T. W. SORAN.